(12) United States Patent
Jones et al.

(10) Patent No.: US 7,156,177 B2
(45) Date of Patent: Jan. 2, 2007

(54) SCALE DISSOLVER FLUID

(75) Inventors: Timothy Gareth John Jones, Cottenham (GB); Gary John Tustin, Sawston (GB); Philip Fletcher, Houston, TX (US); Jesse Ching-Wang Lee, Sugar Land, TX (US)

(73) Assignee: Schlumberger Technology Corporation, Ridgefield, CT (US)

( * ) Notice: Subject to any disclaimer, the term of this patent is extended or adjusted under 35 U.S.C. 154(b) by 204 days.

(21) Appl. No.: 10/343,245

(22) PCT Filed: Jul. 23, 2001

(86) PCT No.: PCT/GB01/03294

§ 371 (c)(1),
(2), (4) Date: Jul. 31, 2003

(87) PCT Pub. No.: WO02/12673

PCT Pub. Date: Feb. 14, 2002

(65) Prior Publication Data

US 2004/0011527 A1    Jan. 22, 2004

(51) Int. Cl.
*E21B 37/06* (2006.01)

(52) U.S. Cl. ............... 166/304; 166/312; 507/240; 507/241; 507/260; 507/267; 507/276

(58) Field of Classification Search ......... 166/300, 166/304, 305.1, 311, 312; 507/240, 241, 507/260, 267, 276
See application file for complete search history.

(56) References Cited

U.S. PATENT DOCUMENTS

| | | | |
|---|---|---|---|
| 2,877,848 A | 3/1959 | Case | |
| 2,994,660 A | 8/1961 | Reddie et al. | |
| 3,684,720 A | 8/1972 | Richardson | |
| 3,721,707 A | 3/1973 | Straus et al. | |
| 4,108,779 A | 8/1978 | Carney | |
| 4,556,107 A | 12/1985 | Duerksen et al. | |
| 4,556,495 A | 12/1985 | Shaw | |
| 4,576,232 A | 3/1986 | Duerksen et al. | |
| 4,607,700 A | 8/1986 | Duerksen et al. | |
| 4,630,679 A * | 12/1986 | Reeves et al. | ........... 166/305.1 |
| 4,725,372 A | 2/1988 | Teot et al. | |
| 4,735,731 A | 4/1988 | Rose et al. | |
| 4,790,958 A * | 12/1988 | Teot | ........................ 507/237 |
| 4,819,729 A | 4/1989 | Bae et al. | |
| 5,110,487 A | 5/1992 | Current | |
| 5,183,112 A | 2/1993 | Paul et al. | |

(Continued)

FOREIGN PATENT DOCUMENTS

EP    0 835 983 A2    4/1998

(Continued)

OTHER PUBLICATIONS

Cates et al Statics and dynamics of worm-like surfactant micelles J. Phys. Condens. Matter, vol. 2, 1990, pp. 6869-6892.

(Continued)

*Primary Examiner*—Zakiya W. Bates
(74) *Attorney, Agent, or Firm*—Steven Gahlings; Jody Lynn DeStefanis; Dale Gaudier

(57) ABSTRACT

A scale dissolver fluid for dissolving scale in a subterranean hydrocarbon-bearing formation comprises an effective amount of a scale dissolver formulation and an effective amount of a surfactant for controlling the viscosity of the fluid. In use, formation hydrocarbons act on the surfactant to reduce the viscosity of the fluid so that the fluid selectively invades a hydrocarbon-bearing zone of the formation.

11 Claims, 6 Drawing Sheets

U.S. PATENT DOCUMENTS

| | | | |
|---|---|---|---|
| 5,193,618 | A | 3/1993 | Loh et al. |
| 5,258,137 | A | 11/1993 | Bonekamp et al. |
| 5,551,516 | A | 9/1996 | Norman et al. |
| 5,656,586 | A | 8/1997 | Li et al. |
| 5,710,121 | A | 1/1998 | Tracy et al. |
| 5,789,371 | A | 8/1998 | Tracy et al. |
| 5,846,926 | A | 12/1998 | Tracy et al. |
| 5,922,671 | A | 7/1999 | Tracy et al. |
| 5,952,290 | A | 9/1999 | Li et al. |
| 5,964,295 | A | 10/1999 | Brown et al. |
| 5,979,557 | A | 11/1999 | Card et al. |
| 6,194,356 | B1 | 2/2001 | Jones et al. |
| 6,232,274 | B1 | 5/2001 | Hughes et al. |
| 6,248,699 | B1 | 6/2001 | Subramanian et al. |
| 6,433,075 | B1 | 8/2002 | Davies et al. |
| 6,443,228 | B1 | 9/2002 | Aronstam et al. |
| 6,613,720 | B1 * | 9/2003 | Feraud et al. ............... 507/200 |
| 6,702,023 | B1 * | 3/2004 | Harris et al. ................ 166/307 |
| 2002/0004464 | A1 | 1/2002 | Nelson et al. |

FOREIGN PATENT DOCUMENTS

| | | |
|---|---|---|
| EP | 0 835 983 A3 | 4/1998 |
| GB | 2 332 223 B | 1/2000 |
| GB | 2 332 224 B | 1/2000 |
| GB | 2 335 680 B | 5/2000 |
| GB | 2 335 679 B | 9/2000 |
| GB | 2 365 427 A | 2/2002 |
| GB | 2 365 464 B | 9/2002 |
| NO | 310.910 B1 | 9/2001 |
| WO | 93/04259 A1 | 3/1993 |
| WO | 96/37683 A1 | 11/1996 |
| WO | 98/56497 A1 | 12/1998 |
| WO | 99/50529 A1 | 10/1999 |
| WO | 01/77487 A2 | 10/2001 |
| WO | 01/77487 A3 | 10/2001 |
| WO | 02/11873 A1 | 2/2002 |
| WO | 02/12673 A1 | 2/2002 |

OTHER PUBLICATIONS

Hoffmann et al Gels from surfactant solutions with densely packed multilamellar vesicles Faraday Discuss, vol. 101, 1995, pp. 319-333.

Hoffmann et al Surfactants, micelles and fascinating phenomena Angew. Chem.. Int. Ed. Engl., vol. 27, 1988, pp. 902-912.

Przybylinski et al Field test of a unique phosphonate scale inhibitor for extended-life squeeze treatment in sandstone SPE International Symposium on Oilfield Chemistry, Houston, Texas, Feb. 16-19, 1999, SPE 50703.

Putnis et al The efficiency of a DTPA-based solvent in the dissolution of barium sulfate scale deposits SPE International Symposium on Oilfield Chemistry, San Antonio, Texas, Feb. 14-17, 1995, SPE 29094.

Rose, G. D. and Teot, A. S. Viscoelastic surfactants: rheology control without polymers or particulates Structure and Flow in Surfactant Solutions, Herb, C. A. and Prud'homme, R. K. (eds.), ACS Symposium Ser. 578, American Chemical Society, Washington D.C., 1994, pp. 352-369.

Samuel et al Polymer-free fluid for hydraulic fracturing SPE Annual Technical Conference and Exhibition, San Antonio, Texas, Oct. 22-25, 1997, SPE 38622.

Chang et al Case study of a novel acid-diversion technique in carbonate reservoirs SPE Annual Technical Conference and Exhibition, Houston, Texas, Oct. 3-6, 1999, SPE 56529.

Dam et al Synthesis, surface properties and oil solubilisation capacity of cationic gemini surfactants Colloids Surfaces A, vol. 118, 1996, pp. 41-49.

Duivenvoorde et al Synthesis and properties of di-n-dodecyl a,w-alkyl bisphosphate surfactants Langmuir, vol. 13, 1997, pp. 3737-3743.

Henkel Corporation Chemicals Group Abstracts of dimer acid use—patents and journal references Henkel Corporation Technical Bulletin 109A, vol. 1, 1968.

In et al Dynamics of branched threadlike micelles physical review letters, vol. 83, No. 11, 1999, pp. 2278-2281.

In et al Quaternary ammonium bromide surfactant oligomers in aqueous solution: self-association and microstructure Langmuir, vol. 16, 2000, pp. 141-148.

Jaeger et al Double-chain surfactants with two carboxylate head groups that form vesicles Langmuir, vol. 12, 1996, pp. 1976-1980.

Johnson Polymerization of fatty acids Fatty acids in industry (Johnson and Fritz eds.), Marcel Dekker, New York, 1989, pp. 153-175.

Kern et al Dynamical properties of salt-free viscoelastic micellar solutions Langmuir, vol. 10, 1994, pp. 1714-1723.

Kim et al Surface-active properties of novel cationic surfactants with two alkyl chains and two ammonio groups J. Amer. Oil Chem. Soc., vol. 73, No. 7, 1996, pp. 907-911.

Knaebel et al Lamellar structures in aqueous solutions of a dimeric surfactant Langmuir, vol. 16, 2000, pp. 2489-2494.

Luchetti et al NMR investigation on the various aggregates formed by a Gemini chiral surfactant Langmuir, vol. 16, 2000, pp. 161-165.

Menger et al Cross-linked micelles Langmuir, vol. 11, 1995, pp. 1855-1857.

Menger et al Gemini surfactants with acetylenic spacers Langmuir, vol. 16, 2000, pp. 2062-2067.

Oda et al Elongated aggregates formed by cationic gemini surfactants Langmuir, vol. 15, 1999, pp. 2384-2390.

Oude Alink Fatty acids in oil field chemicals Fatty acids in industry (Johnson and Fritz eds.), Marcel Dekkar, New York, 1989, pp. 407-429.

Paubert et al Sulphonates derived from dimer acids and esters Tenside Surf. Det., 32, 1995, pp. 36-44.

Pérez et al Synthesis, aggregation and biological properties of a new class of gemini cationic amphiphilic compounds from arginine, bis(args) Langmuir, vol. 12, 1996, pp. 5296-5301.

Rosen et al Gemini surfactants J. Surfactants and Detergents, vol. 1, No. 4, 1998, pp. 547-554.

Song et al Surface properties, micellization and premicellar aggregation of gemini surfactants with rigid and flexible spacers Langmuir, vol. 12, 1996, pp. 1149-1153.

Sonntag Dehydration, pyrolysis and polymerization Fatty Acids: Their Chemistry, Properties, Production, and Uses, Part 2, 2nd ed. (Markley ed.), Interscience Publishers, New York, 1961, pp. 1036-1054.

Zana Dimeric (gemini) surfactants Novel surfactants: preparation, applications and biodegradability (Holmberg ed.), Marcel Dekker, New York, 1998, pp. 241-277.

Zana Gemini (dimeric) surfactants Current Opinion Colloid and Interface Sci., vol. 1, 1996, pp. 566-571.

Zana et al Micellization of two triquaternary ammonium surfactants in aqueous solutions Langmuir, vol. 11, 1995, pp. 3694-3698.

Zana Physicochemical properties of dimeric surfactants in aqueous solution Structure-performance relationships in surfactants (Esumi and Ueno eds.), Marcel Dekker, New York, 1997, pp. 255-283.

Zhao et al Mixtures of monomeric and dimeric cationic surfactants J. Phys. Chem. B., vol. 102, 1998, pp. 7613-7618.

Zhu et al Double-chain surfactants with two carboxylate groups and their relation to similar double-chain compounds J. Colloid and Interface Sci., vol. 158, 1993, pp. 40-45.

Zhu et al Preparation and properties of double-chain bis (quanternary ammonium) compounds J. Japan. Oil Chem. Soc., vol. 42, No. 3, 1993, pp. 161-167.

* cited by examiner

```
┌─────────────────────────────┐
│ Pump scale dissolver fluid  │
│ through well bore and into  │
│ formation                   │
└─────────────────────────────┘
```

```
┌─────────────────────────────┐
│ Formation hydrocarbons      │
│ reduce viscosity of         │
│ scale dissolver             │
└─────────────────────────────┘
```

```
┌─────────────────────────────┐
│ Scale dissolver fluid       │
│ selectively invades         │
│ hydrocarbon-bearing zone    │
└─────────────────────────────┘
```

Fig. 6

SCALE DISSOLVER FLUID

FIELD OF THE INVENTION

The present invention relates to a scale dissolver fluid for dissolving scale in hydrocarbon wells, and to a method of dissolving scale in hydrocarbon wells.

BACKGROUND OF THE INVENTION

The recovery of hydrocarbons, such as oil and gas, from a subterranean well formation can be impeded by scales obstructing the flow of hydrocarbons from hydrocarbon-bearing zones of the formation. Typical scales are barite (e.g. $BaSO_4$) or calcite (e.g. $CaCO_3$) and it is common practice to treat these by bull-heading an aqueous-based scale dissolver fluid through a well bore and into the formation.

For example, one conventional scale dissolver for barite scale consists of a concentrated solution of potassium carbonate, potassium hydroxide and the potassium salt of ethylenediaminetetraacetic acid(EDTA), the corrosive and chelating nature of the solution being effective in removing scale. Carbonate scales may be dissolved using simple mineral acids, such as HCl.

However, hydrocarbon-producing wells often contain zones that are watered-out, producing only, or very largely, water. If the scale dissolver enters these zones, scale may also be removed therefrom. This can lead to an undesirable increase in the water cut of the fluid produced by the well.

In related but different fields of hydrocarbon recovery (notably the field of hydraulic fracturing, as described for example in EP-A-0835983), significant use is made of viscoelastic fluids. These fluids are typically based on aqueous solutions of surfactants, such as erucyl bis(2-hydroxyethyl) methyl ammonium chloride or potassium oleate, which can form worm-like micelles when mixed with brines, e.g. KCl brine. The structure of the micelles contributes significantly to the viscoelasticity of the fluid, and viscoelasticity is rapidly lost when the fluid contacts hydrocarbons which cause the micelles to change structure or disband.

SUMMARY OF THE INVENTION

In accordance with the present invention a scale dissolver fluid is provided for dissolving scale in a hydrocarbon well, the fluid including means for controlling the viscosity of the fluid.

A first aspect of the present invention provides a scale dissolver fluid for dissolving scale in a subterranean hydrocarbon-bearing formation, the fluid comprising an effective amount of a scale dissolver formulation and an effective amount of a surfactant for controlling the viscosity of the fluid, whereby in use formation hydrocarbons act on the surfactant to reduce the viscosity of the fluid so that the fluid selectively invades a hydrocarbon-bearing zone of the formation.

In use the fluid is injected into the subterranean formation in a relatively viscous state. If the injected fluid contacts a watered-out zone of the formation the viscous nature of the fluid remains essentially unaltered and, to a significant extent, the fluid is prevented from entering the watered-out zone, i.e. the fluid locally has limited injectivity. Conversely, if the fluid contacts a hydrocarbon-bearing zone of the formation the viscosity is locally significantly reduced and the fluid is able to penetrate the hydrocarbon-bearing zone.

Therefore, the difference in viscosity of the fluid when in contact with hydrocarbons and water advantageously allows a selective placement of the scale treatment, and as a result scale may be preferentially removed from hydrocarbon-bearing zones. This can lead to a stimulation of hydrocarbon production without a substantial increase in the water cut of produced fluids.

Preferably, the surfactant controls the viscosity by reversibly producing viscoelasticity in the fluid. That is, the fluid is viscoelastic in nature when injected and this property is maintained in aqueous environments (e.g. watered-out zones). However, formation hydrocarbons act on the surfactant to destroy or reduce the viscoelasticity, allowing the fluid to penetrate hydrocarbon-bearing zones.

By "viscoelastic", we mean that the elastic (or storage) modulus G' of the fluid is greater than the loss modulus G" as measured using an oscillatory shear rheometer (such as a Bohlin CVO 50) at a frequency of 1 Hz. The measurement of these moduli is described in *An Introduction to Rheology*, by H. A. Barnes, J. F. Hutton, and K. Walters, Elsevier, Amsterdam (1997).

More preferably the scale dissolver formulation activates the production of viscoelasticity by the surfactant. In this way it may not be necessary to add additional agents, such as KCl brine, to activate the production of viscoelasticity. However, the use of such additional agents is not excluded by the present invention. The scale dissolver formulation may comprise any acid or alkaline solution that dissolves minerals and other well bore deposits (including organic deposits). Desirably the scale dissolver formulation comprises an aqueous solution of at least one of an alkali metal carbonate, alkali metal hydroxide, EDTA and the alkali metal salt of EDTA. The alkali metal may be potassium. Alternatively the scale dissolver formulation may comprise a mineral acid, such as HCl.

The surfactant of the scale dissolver fluid may be any anionic or cationic surfactant that forms a viscoelastic gel in aqueous media and whose viscoelasticity is reduced or destroyed on contact with hydrocarbons. For example the surfactant may comprise N-erucyl-N,N-bis(2-hydroxyethyl)-N-methyl ammonium chloride, a salt of oleic acid (e.g. an alkali metal salt such as potassium oleate), or a salt of an oligomer of oleic acid (e.g. an alkali metal salt, such as a potassium salt). The oleic acid salt and oleic acid oligomer salt may be formed in situ from the corresponding acid precursors. By an "oligomer of oleic acid" we mean an unhydrogenated, a fully hydrogenated or a partially hydrogenated oligomer of oleic acid.

A second aspect of the invention provides a scale dissolver fluid for dissolving scale in a subterranean formation, the fluid comprising an aqueous solution of at least one scale dissolving component and at least one surfactant, and having substantially Newtonian viscous behaviour at least in the shear rate range 0.1–100 (preferably 0.1–1000) $s^{-1}$ and a viscosity in the range 20 to 1000 (preferably 100 to 1000) centipoise at 60° C., the viscosity falling to a value in the range 1 to 200 (preferably 1 to 50) centipoise on contact with a hydrocarbon fluid, such as heptane, mineral spirits or crude oil.

Depending on the type of scales, fluids of different pH might be suitable. For instance, for barium and strontium sulphate, fluids having a pH greater than 12 are usually required. Anionic surfactants (for examplesalts of oleic acid or of an oligomer of oleic acid e.g. an alkali metal salt, such as a potassium salt) compatible with such high pH, are therefore preferred. For calcium sulphate, a pH ranging from 7 to 10 is suitable, a preferred option is a cationic surfactant.

This is also the case with calcium carbonate, where the pH has preferably to be optimised close to 5.

A third aspect of the present invention provides a method of dissolving scale in a subterranean formation with at least one hydrocarbon-bearing zone, the method including pumping the scale dissolver fluid of the first or second aspect of the invention through a well bore and into the subterranean formation, the viscosity of the scale dissolver fluid being reduced by formation hydrocarbons so that the fluid selectively invades the hydrocarbon-bearing zone of the well to dissolve scale in the hydrocarbon-bearing zone A fourth aspect of the present invention provides a method of injecting a scale dissolver fluid into a subterranean formation with at least one hydrocarbon-bearing zone, the method including the step of pumping the scale dissolver fluid of the first or second aspect of the invention through a well bore and into the subterranean formation.

In both the third and fourth aspects of the invention, preferably the scale dissolver fluid is bull-headed through the well bore.

BRIEF DESCRIPTION OF THE DRAWINGS

Specific embodiments of the present invention will now be described with reference to the following drawings in which:

FIG. 6 shows schematically the steps involved in deploying a scale dissolver fluid of the present invention;

DETAILED DESCRIPTION

Figure 1:
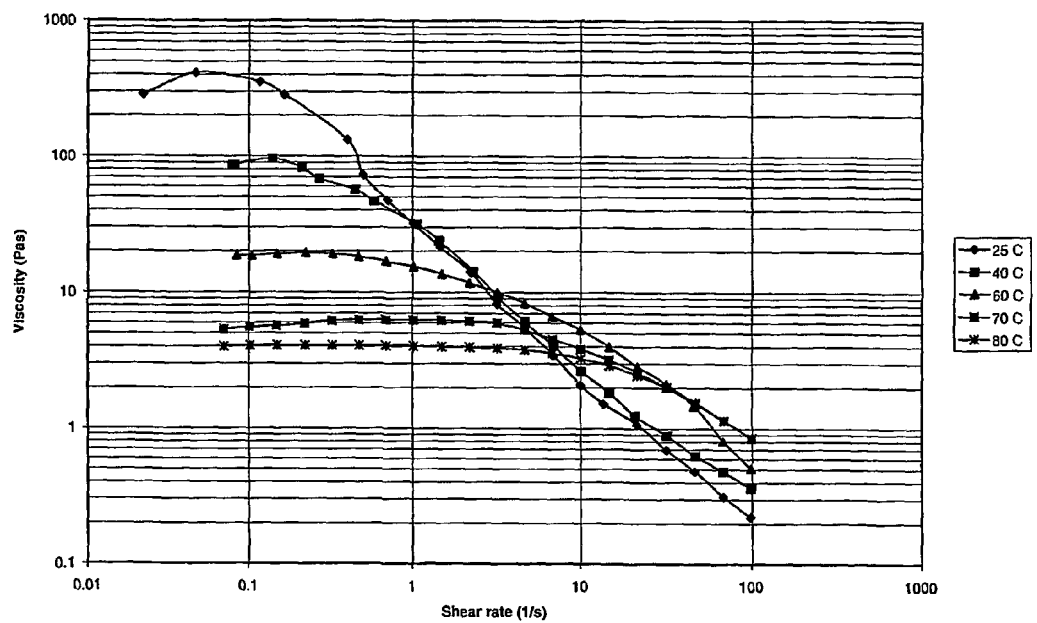
FIG. 1 shows a graph of viscosity against shear rate at various temperatures for a scale dissolver fluid containing N-erucyl-N,N-bis(2-hydroxyethyl)-N-methyl ammonium chloride.

The scale dissolver fluid of the present invention has an enhanced rheological performance which allows it to dissolve scales preferentially in hydrocarbon-bearing matrices of subterranean formations. To a significant extent this performance is due to the ability of the fluid to vary its viscosity depending on whether it is in contact with water or hydrocarbons. In contrast, conventional scale dissolver fluids remove scale deposits indiscriminately from hydrocarbon and water-bearing zones alike.

Scale dissolver fluids of the present invention may contain viscoelastic surfactants for forming viscoelastic gels. If the fluid is considered as a combination of a conventional scale dissolver fluid and such a surfactant, the viscosity of the gel can be reduced to substantially that of the conventional fluid when the gel comes into contact with hydrocarbons, making the scale dissolver formulation of the fluid readily injectable into hydrocarbon-bearing matrices. However, when the gel contacts water it remains highly viscous (and therefore not easily injectable), any reduction in viscosity being essentially due to dilution. Effectively the highly viscous gel acts as a diverting agent and allows a high proportion of the scale dissolver formulation to be placed in hydrocarbon zones.

EXAMPLE 1

13 g of EDTA, 11.25 g of potassium hydroxide and 2.25 g of potassium carbonate were dissolved in 70.5 g of water. 3 g of N-erucyl-N,N-bis(2-hydroxyethyl)-N-methyl ammonium chloride was then added and the mixture stirred until a homogeneous gel was formed.

EXAMPLE 2

6.5 g of EDTA, 5.625 g of potassium hydroxide and 1.125 g of potassium carbonate were dissolved in 83.75 g of water. 3 g of potassium oleate was then added and the mixture stirred until a homogeneous gel was formed.

In Examples 1 and 2 the potassium hydroxide and the potassium carbonate activated the production of viscoelasticity by the N-erucyl-N,N-bis(2-hydroxyethyl)-N-methyl ammonium chloride and potassium oleate respectively.

A controlled stress rheometer (Bohlin model type CVO-50) was used to measure the rheological properties of the systems of Examples 1 and 2. Using a concentric cylinders (Couette) geometry (inner radius of the outer cylinder, $R_i$=1.375 cm, outer radius of the inner cylinder, $R_o$=1.25 cm, and inner cylinder length=3.78 cm), corresponding to the geometry of German DIN standard 53019, the viscosity of the sample was measured at several applied shear stresses within a specified range. The typical range of shear stress was 0.5–40 Pa corresponding to a shear rate range of 0.005 to $1000s^{-1}$. Measurements were made at increasing and then decreasing shear rate. Typically, the complete set of measurements consisted of 40 viscosity measurements, each taken after a delay time of 10 seconds at constant shear stress and shear rate.

For the particular geometry of the rheometer, the shear rate was calculated as:

$$\dot{\gamma} = \frac{RPM \cdot 2\pi}{60} \frac{2 \cdot R_i^2 R_0^2}{\left(\frac{R_i + R_0}{2}\right)^2 (R_0^2 - R_i^2)},$$

where RPM is the relative rotational speed (in revolutions per minute) of the cylinders. The viscosity was then obtained for each measurement by dividing the measured stress by the calculated shear rate.

Figure 2:
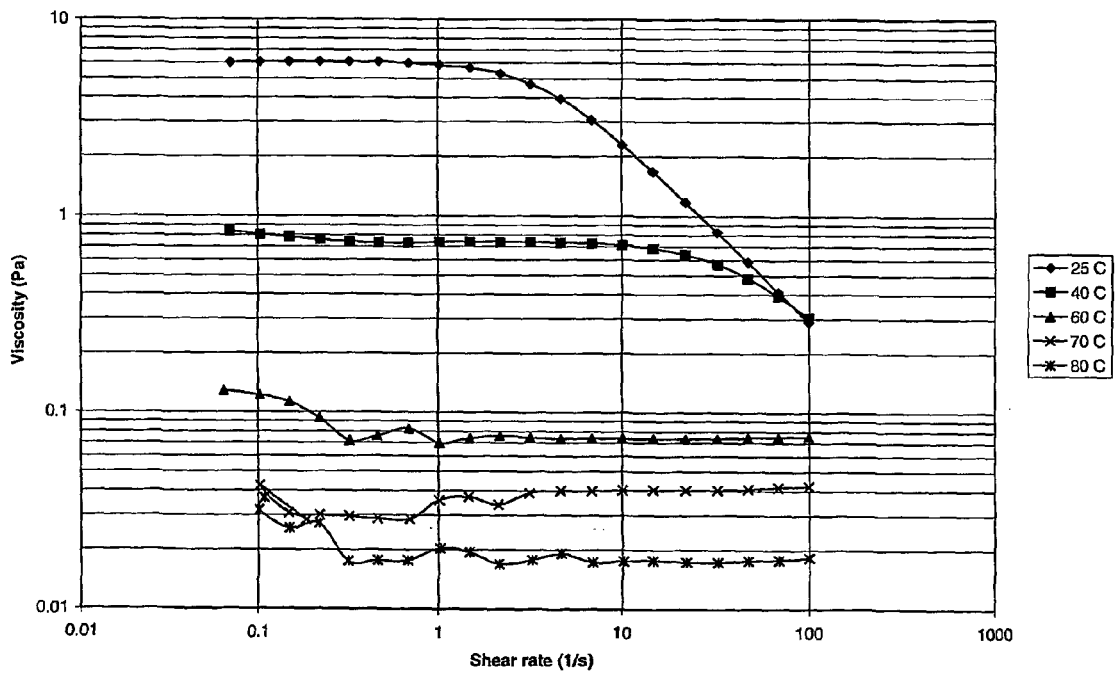
FIG. 2 shows a graph of viscosity against shear rate at various temperatures for a scale dissolver fluid containing potassium oleate.
Figure 3:
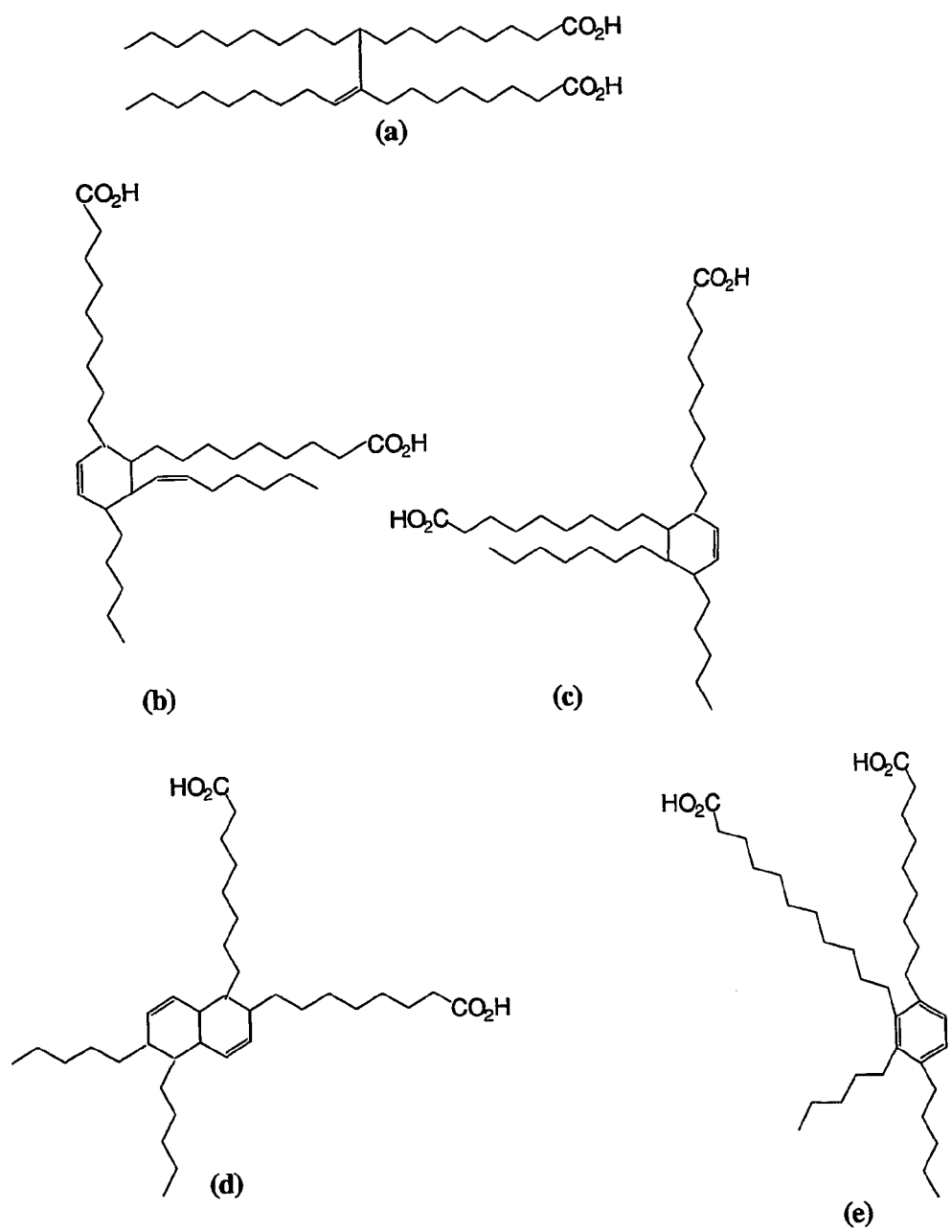
FIGS. 3a–e show various oleic acid dimers.

FIGS. 1 and 2 respectively illustrate the rheology of the systems of Examples 1 and 2 measured in this way at various temperatures in the range 25–80° C. Varying the amount of surfactant or changing the types of inorganic ions can vary the rheology of each gel so that the gel can be optimised for specific applications.

EXAMPLE 3

The oligomerisation of oleic acid generally leads to the production of complex mixtures of dimeric and trimeric products. Commercially available mixtures, such as the Empol™ series of dimers and trimers from Henkel Corporations Chemical Group (4900 Este Avenue-Bldg 53, Cincinnati, Ohio 45232, USA) are suitable for putting the present invention into operation. Alternative suppliers of suitable mixtures are e.g. Union Camp (Vigo Lane, Chesterle-Street. Co. Durham DH3 2RB, UK) and Expo Chemical Company Inc. (12602 Manorwood, Cypress (Houston), Tex. 77429, USA). FIGS. 3a–e show typical chemical structures of dimeric components of these mixtures. Clearly the components have different degrees of hydrogenation.

EDTA (13 g), potassium hydroxide (11.25 g) and potassium carbonate (2.25 g) were dissolved in water (70.5 g). Empol™ 1016 dimer acid (3 g) was then added and the mixture stirred until it became a homogeneous gel.

EXAMPLE 4

EDTA (8.66 g), potassium hydroxide (7.5 g) and potassium carbonate (1.5 g) were dissolved in water (79 g). Empol™ 1043 trimer acid (3 g) was then added and the mixture stirred until it became a homogeneous gel.

Figure 4:
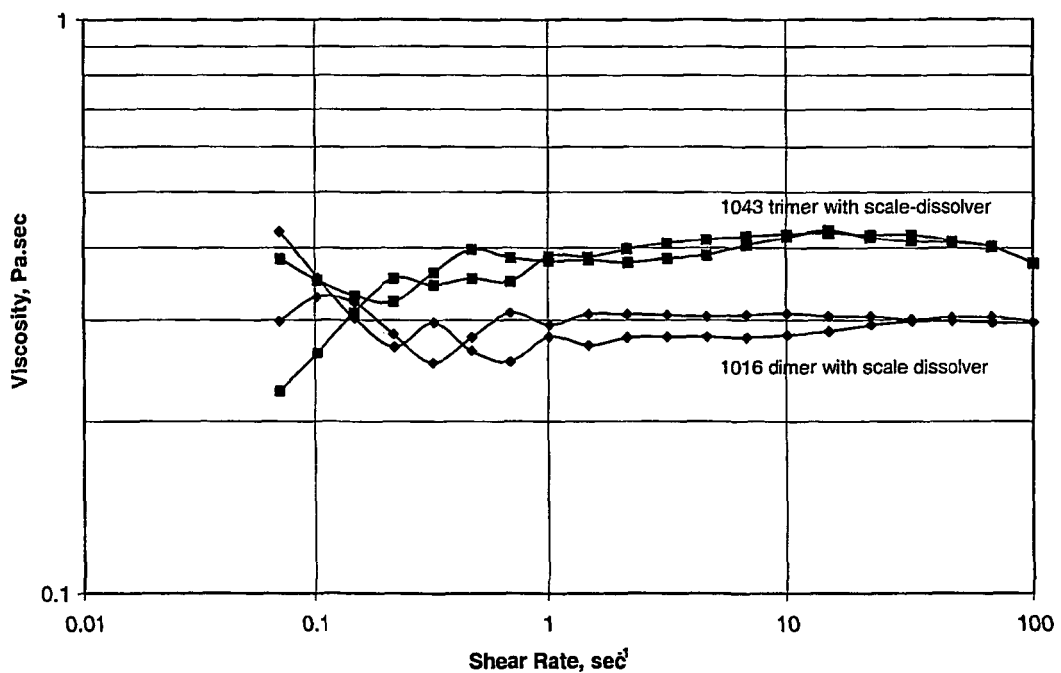
FIG. 4 shows a graph comparing the rheology of two scale dissolver fluids comprising oleic acid oligomers at 60° C.

The viscosities of the gels of Examples 3 and 4 were measured (using the procedure described above for Examples 1 and 2) at 60° C. over a range of shear rates. The results of these measurements are shown in FIG. 4. Both gels exhibited Newtonian rheology over a surprisingly wide range of shear rates. Advantageously, therefore, the injectivity of the gels into subterranean matrices should not be affected by changes in shear rate which may occur during the placement process. However, the viscosity of a scale dissolver fluid containing a mixture of such oligomers can be controlled by adjusting the amount and type of oligomer in the mixture.

A 150 cP gel based on the formulation of Example 3 was injected into an oil-saturated core and a water-saturated core by forcing the gel down a supply line which branched into two parallel lines leading to the two cores. Both cores were of Bentheimer sandstone and had equal total pore volumes. By measuring the relative amounts of gel entering the two cores at a given supply pressure or for a given volume of supplied gel, the relative injectivities of the gel through the two cores was determined.

Figure 5:
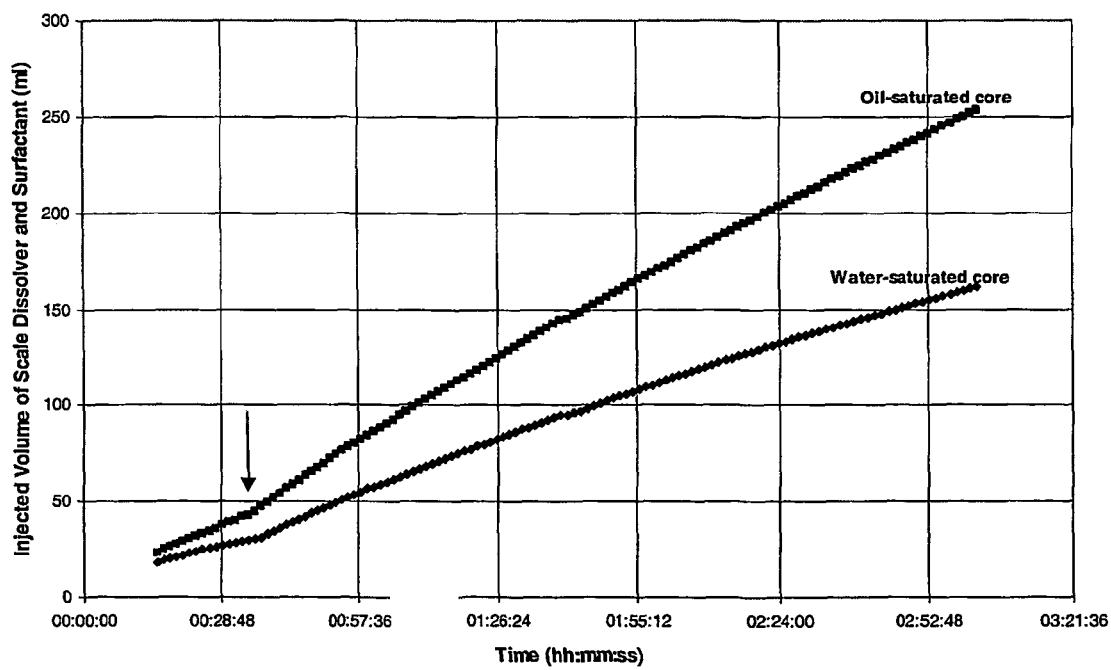
FIG. 5 shows a graph comparing the injectivities into oil and water-saturated cores of a scale dissolver fluid.

Injection profiles of the gel into the two cores with the fluid and cores maintained at a temperature of 60° C. are shown in FIG. 5. The permeability of the water-saturated core was 1.6 darcies while that of the oil-saturated core was 1.4 darcies; both cores had a porosity of 22%. The profiles demonstrate that the volume of gel entering the oil-saturated core is approximately 50% greater than that entering the water-saturated core. The preference of the gel to enter the oil-saturated core is maintained even after a large number of pore volumes was passed through the two cores. The viscosity of the effluent from the oil-saturated core was significantly lower than that of the injected gel throughout the duration of the experiment and demonstrated that the surfactant gel was continually mix with oil. In contrast, the viscosity of the effluent from the water-saturated core was similar to that of the injected gel. Higher viscosity fluids enhance this contrast and fluids can be developed that only enter oil-bearing zones, the viscosity being too high for injection into the water-bearing zones.

FIG. 6 shows schematically the steps involved in the deployment of a scale dissolver fluid of the present invention.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

EXAMPLE 5

Figure 7:
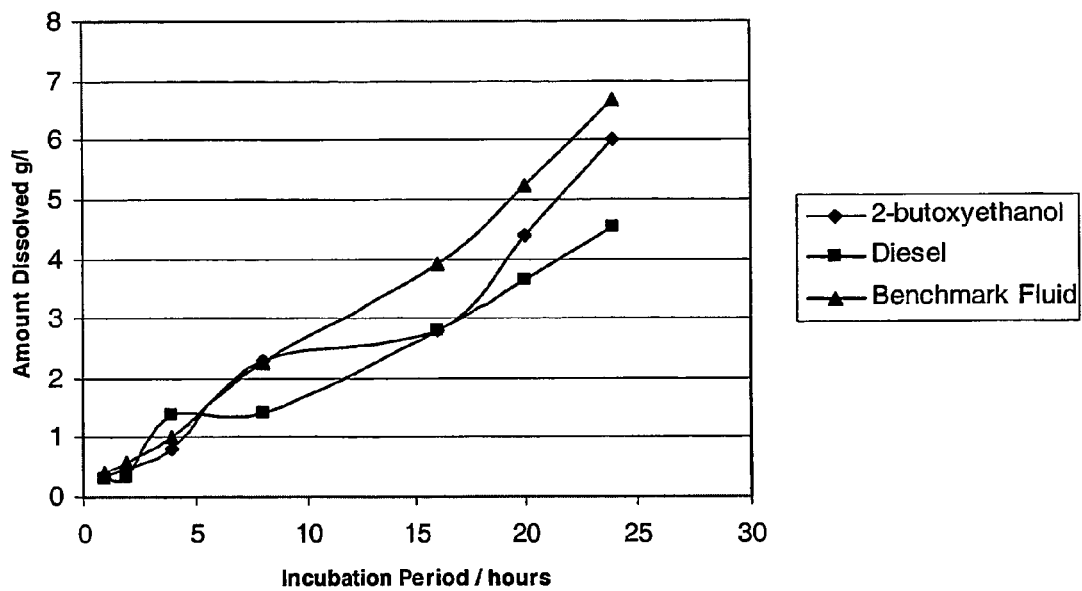
FIG. 7 shows a plot of the amount dissolved (g/l) versus the incubation time.

A viscoelastic fluid, composed of 8.1 g ethylenediaminetetraacetic acid, 7.22 g potassium hydroxide, 1.4 g potassium carbonate, 2 g oleic acid and 81.3 g of water, was constructed. To this fluid was added 5 ml of diesel oil in order to reduce viscosity; this process is known as breaking the fluid. To 10 ml of this reduced viscosity fluid was added to an exactly known mass of crystalline barium sulphate $M_1$ (mass approximately 1 g) with an approximate mean particle size of 100 $\mu$M. The mixture was incubated in a plastic bottle at 50° C. for 1 hour, after which the solid barium sulphate was removed by decantation, washed with distilled water, dried at 70° C. and the new mass $M_2$ determined. The difference between $M_1$ and $M_2$ was used to compute the amount dissolved in g/l at the specified time. This experiment was repeated for incubation times of 1 hr, 2 hr, 4 hr, 8 hr, 16 hr, 20 hr and 24 hrs. FIG. 7 shows a plot of the amount dissolved (g/l) versus the incubation time. Data are compared to an identical suite of measurements collected using 2-butoxyethanol as an alternative viscosity reducer to diesel, and also to data collected using the dissolver formulation made without oleic acid. This later formulation is simply a surfactant-free chelating dissolver used as a benchmark.

Inspection of FIG. 7 demonstrates that a dissolver fluid, having once been viscous for the purpose of diversion but now broken, can dissolve barium sulphate with an efficiency close to that of a benchmark dissolver.

EXAMPLE 6

Figure 8:
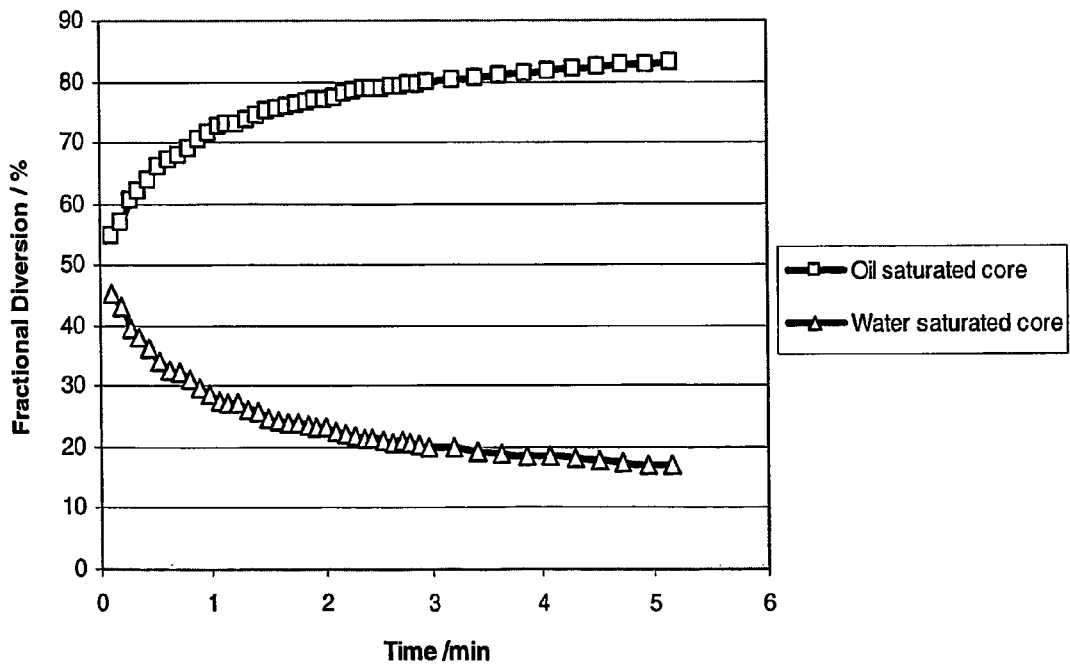
FIG. 8 shows the fluid expelled from each core expressed as a fraction of total fluid expelled from both cores.

An experimetal setup was constructed in order to inject a viscoelastic scale dissolver fluid through two fluid saturated cores simultaneously. Both cores had permeabilities of approximately 50 mD, but one core was saturated to 80% with hydrocarbon and 20% with water, the other was saturated to 80% with water and 20% with diesel oil. The viscoelastic scale dissolver was composed of 9 g ethylenediaminetetraacetic acid, 6.8 g potassium hydroxide, 2 g oleic acid and 100 g of water. This fluid was injected simultaneously through both cores, through a supply line that branched into two parallel lines leading into each core. Tests were conducted at 50° C. using 12 inch cores with a differential pressure of 100 psi. Immediately upon onset of injection the mass of fluid expelled from each core was determined, by weighing the expelled fluid, continuously as a function of time over a period of 25 minutes. FIG. 8 shows the fluid expelled from each core expressed as a fraction of total fluid expelled from both cores.

This shows that over 80% of the injected fluid can be diverted through a predominantly oil-bearing core, despite the fact that this had approximately 20% residual water and the water bearing core had approximately 20% diesel oil. The presence of hydrocarbon in the water core is expected to break the fluid to some extent, and the presence of water in the oil core is expected to limit breaking, both factors will act against diversion. The high level of diversion, even in these cases, indicates that diversion can be maintained with a suitable fluid formulation.

This experiment was repeated using a viscoelastic scale dissolver composed of 9 g ethylenediaminetetraacetic acid, 6.8 g potassium hydroxide, 2 g oleic acid, 1 g of a sugar surfactant (an alkyl polyglycoside of CAS number 68515-73-1) and 100 g of water. The core permeabilities were approximately 700 mD.

Figure 9:
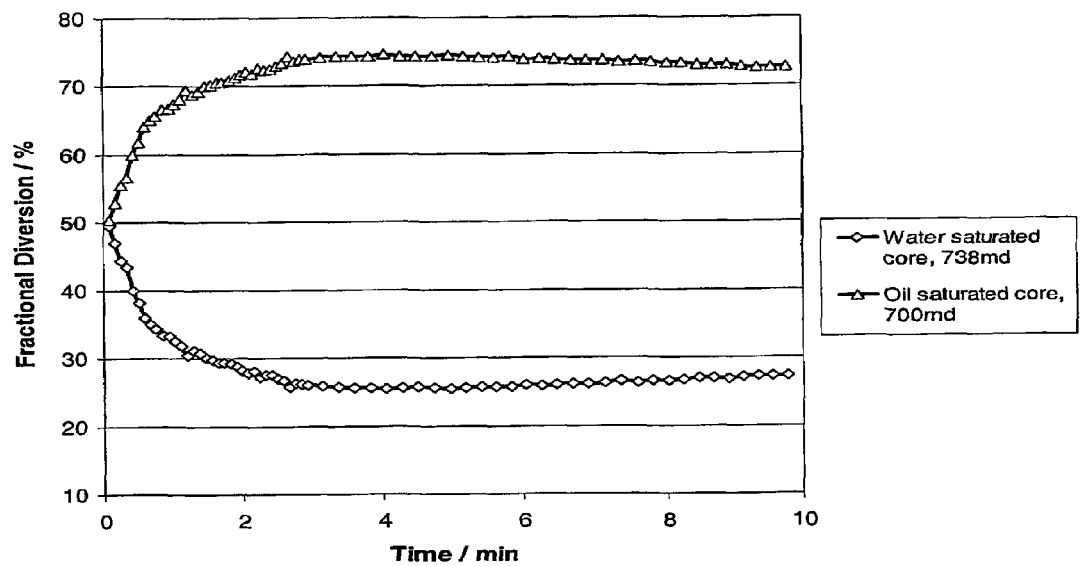
FIG. 9 shows the fractional diversion in the low permeability cores.

FIG. 9 shows the fractional diversion in the low permeability cores. With this formulation, a reduced diversion was observed but the data indicates that alternative surfactants may be compatible with scale dissolver formulations.

EXAMPLE 7

An experimental setup was constructed in order to inject a viscoelastic scale dissolver fluid independently through two cores having a permeability contrast of over one order of magnitude. The low permeability core (50 mD) was saturated to 100% with diesel oil and the high permeability core (700 mD) was saturated to 100% with water. The viscoelastic scale dissolver was composed of 9 g ethylenediaminetetraacetic acid, 6.8 g potassium hydroxide, 2 g oleic acid and 100 g of water. This fluid was injected independently through each core using a single supply line into the respective core. The independent use of cores differentiates this test from that in Example 7, which involved simultaneous core flooding. Tests were conducted at 50° C. using 12 inch cores with a differential pressure of 100 psi. Immediately upon onset of injection the mass of fluid expelled from each core was determined, by weighing the expelled fluid, continuously as a function of time over a period of 25 minutes.

Figure 10:
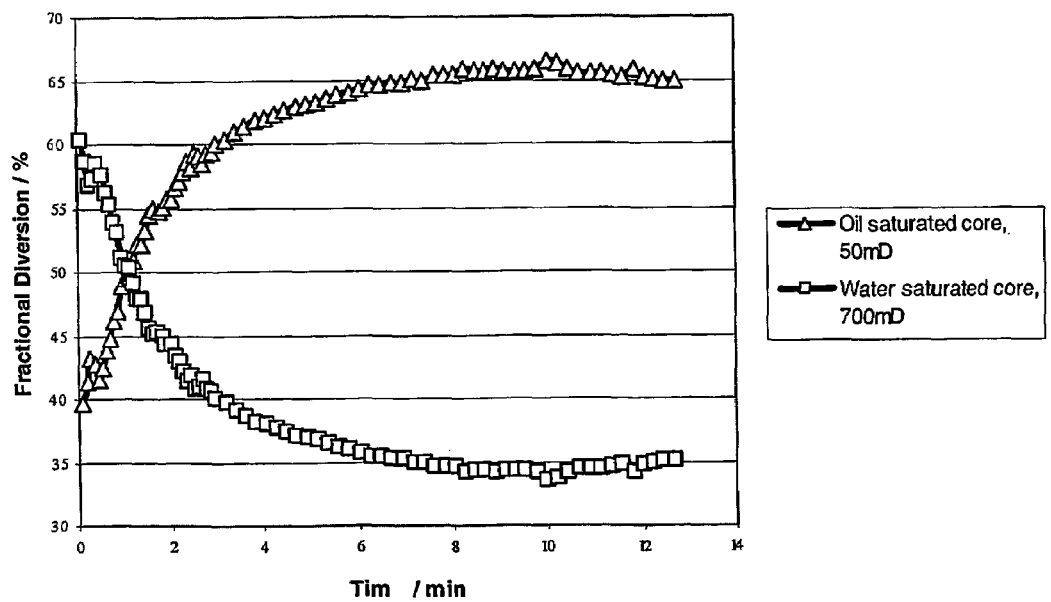
FIG. 10 shows the fluid expelled from each core expressed as a fraction of total fluid expelled form both cores.

FIG. 10 shows the fluid expelled from each core expressed as a fraction of total fluid expelled form both cores. This shows that over 65% of the injected fluid can be diverted through an oil-bearing core despite the fact that the alternative flow path had a massively preferential permeability. The high level of diversion, even in these cases, implies that diversion can be achieved with high permeability contrasts using a suitable fluid formulation.

Various changes to the described embodiments may be made without departing from the spirit and scope of the invention

The invention claimed is:

1. A scale dissolver fluid for dissolving scale in a subterranean hydrocarbon-bearing formation, the fluid comprising an effective amount of a scale dissolver formulation and an effective amount of a surfactant for controlling the viscosity of the fluid, whereby in use formation hydrocarbons act on the surfactant to reduce the viscosity of the fluid so that the fluid selectively invades a hydrocarbon-bearing zone of the formation and wherein the surfactant is a viscoelastic surfactant comprising an oleic acid salt or a salt of an oligomer of oleic acid.

2. A scale dissolver fluid according to claim 1, wherein the surfactant controls the viscosity of the fluid by reversibly producing viscoelasticity in the fluid.

3. A scale dissolver fluid according to claim 2, wherein the scale dissolver formulation activates the production of viscoelasticity by the surfactant.

4. A scale dissolver fluid according to claim 1, wherein the scale dissolver formulation comprises an aqueous solution of at least one of potassium carbonate, potassium hydroxide, ethylenediaminetetraacetic acid (EDTA) and the potassium salt of EDTA.

5. A scale dissolver fluid according to claim 1, wherein the surfactant comprises N-erucyl-N,N-bis(2-hydroxyethyl)-N-methyl ammonium chloride.

6. A scale dissolver fluid according to claim 1, wherein the scale dissolver formulation is an aqueous solution of a scale dissolver selected from the group consisting of an alkali metal, an alkali metal hydroxide, EDTA, an alkali metal salt of EDTA, a mineral acid and a combination of two or more of the aforementioned scale dissolvers.

7. A scale dissolver fluid for dissolving scale in a subterranean formation, the fluid comprising an aqueous solution of at least one scale dissolving component and at least one surfactant, and having substantially Newtonian viscous behaviour at least in the shear rate range $0.1–100\ s^{-1}$ and a viscosity in the range 20 to 1000 centipoise at 60° C., the viscosity falling to a value in the range 1 to 200 centipoise on contact with a hydrocarbon fluid.

8. A method of dissolving scale in a subterranean formation with at least one hydrocarbon-bearing zone, the method including pumping the scale dissolver fluid of claim 1 through a well bore and into the subterranean formation, the viscosity of the scale dissolver fluid being reduced by formation hydrocarbons so that the fluid selectively invades the hydrocarbon-bearing zone of the well to dissolve scale in the hydrocarbon-bearing zone.

9. A method of dissolving scale in a subterranean formation according to claim 8, wherein the scale dissolver fluid is bull-headed through the well bore.

10. A method of injecting a scale dissolver fluid into a subterranean formation with at least one hydrocarbon-bearing zone, the method including the step of pumping the scale dissolver fluid of claim 1 through a well bore and into the subterranean formation.

11. A method of injecting a scale dissolver fluid according to claim 10, wherein the scale dissolver fluid is bull-headed through the well bore.

* * * * *